(12) United States Patent
Onishi et al.

(10) Patent No.: US 12,491,859 B2
(45) Date of Patent: Dec. 9, 2025

(54) UNMANNED CARRIER VEHICLE

(71) Applicant: Mitsubishi Logisnext Co., Ltd., Kyoto (JP)

(72) Inventors: Toshimitsu Onishi, Kyoto (JP); Mitsuki Fujioka, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 35 days.

(21) Appl. No.: 18/773,584

(22) Filed: Jul. 16, 2024

(65) Prior Publication Data

US 2025/0162569 A1     May 22, 2025

(30) Foreign Application Priority Data

Nov. 20, 2023 (JP) ................................. 2023-196601

(51) Int. Cl.
    *B60W 10/20*         (2006.01)
    *B60W 10/184*       (2012.01)

(52) U.S. Cl.
    CPC .......... *B60W 10/20* (2013.01); *B60W 10/184* (2013.01)

(58) Field of Classification Search
CPC ............... B60W 10/20; B60W 10/184; B60W 60/0025; B60W 2050/0297; B60W 2520/06; B60W 2710/18; B60W 2710/207; B60W 2720/24; B60W 30/182; B60T 7/12; B62D 7/1509; B62D 63/02
USPC .......................... 701/41, 42, 43, 44, 48, 70
See application file for complete search history.

(56) References Cited

U.S. PATENT DOCUMENTS

2021/0261102 A1     8/2021     Sato

FOREIGN PATENT DOCUMENTS

| JP | 2007328442 | 12/2007 |
|----|------------|---------|
| JP | 2022059320 | 4/2022  |

*Primary Examiner* — Hai H Huynh
(74) *Attorney, Agent, or Firm* — JCIPRNET

(57) ABSTRACT

An unmanned carrier vehicle switchable between normal and lateral driving mode includes: wheels (a left front wheel, a right front wheel, a left rear wheel, and a right rear wheel), a drive unit that restricts rolling of the left front wheel and the left rear wheel, a steering device that changes direction of the wheels, and a control device. The control device controls the steering device to change direction of the right front wheel and the left rear wheel after changing direction of the left front wheel and the right rear wheel when switching between normal and lateral driving mode; and further controls the drive unit to restrict rolling of the left rear wheel when changing direction of the left front wheel and the right rear wheel, and to restrict rolling of the left front wheel when changing direction of the right front wheel and the left rear wheel.

5 Claims, 8 Drawing Sheets

UNMANNED CARRIER VEHICLE

CROSS-REFERENCE TO RELATED APPLICATIONS

This application claims the priority benefits of Japanese application no. 2023-196601, filed on Nov. 20, 2023. The entity of the above-mentioned patent application is hereby incorporated by reference herein and made a part of this specification.

BACKGROUND

Technical Field

The disclosure relates to an unmanned carrier vehicle capable of switching between a normal driving mode and a lateral driving mode.

Related Art

There is known an unmanned carrier vehicle capable of switching between a normal driving mode, which allows for straight-line travel in a front-rear direction, and a lateral driving mode, which allows for straight-line travel in a left-right direction (see, for example, Patent Document 1). Switching between normal driving mode and lateral driving mode is carried out by changing the direction of the wheels.

FIG. 8A to FIG. 8C illustrate a conventional unmanned carrier vehicle having a vehicle body 102 and a plurality of wheels 103. As shown in FIG. 8A, in the normal driving mode, wheels 103 of the unmanned carrier vehicle face a front-rear direction X. When switching from the normal driving mode to the lateral driving mode, a steering device (not shown) changes the direction of the wheels 103 such that the wheels 103 face a left-right direction Y, as shown in FIG. 8B. At this time, there is a problem that a posture of the vehicle body 102 changes depending on the unevenness of the road surface and the contact state of the wheels 103 with the ground, as shown in FIG. 8C. Thus, as described in Patent Document 1, the posture change of a vehicle body is corrected during travel.

However, when correcting the posture change of the vehicle body during travel, there is a problem that if the distance from the start of travel to the stop is short when switching between normal driving mode and lateral driving mode, the posture change of the vehicle body cannot be sufficiently corrected.

CITATION LIST

Patent Document

[Patent Document 1] Japanese Patent Laid-open No. 2007-328442 A

The disclosure has been made in consideration of the above circumstances, and an object of the disclosure is to provide an unmanned carrier vehicle capable of suppressing the posture change of the vehicle body when switching between a normal driving mode and a lateral driving mode.

SUMMARY

The disclosure provides an unmanned carrier vehicle capable of switching between a normal driving mode, which allows for straight-line travel in a front-rear direction, and a lateral driving mode, which allows for straight-line travel in a left-right direction. The unmanned carrier vehicle includes a plurality of wheels spaced apart in the front-rear direction and the left-right direction; a braking device for restricting rolling of at least two of the wheels; a steering device for changing the direction of the plurality of wheels; and a control device for controlling the braking device and the steering device. The control device, with one set of the wheels as a primary steered wheel and the other one set of the wheels as a secondary steered wheel among the plurality of wheels, controls the steering device to change the direction of the secondary steered wheel after changing the direction of the primary steered wheel when switching between the normal driving mode and the lateral driving mode; and further controls the braking device to restrict the rolling of at least one of the wheels included in the secondary steered wheel when changing the direction of the primary steered wheel, and to restrict the rolling of at least one of the wheels included in the primary steered wheel when changing the direction of the secondary steered wheel.

DESCRIPTION OF THE EMBODIMENTS

Figure 1:
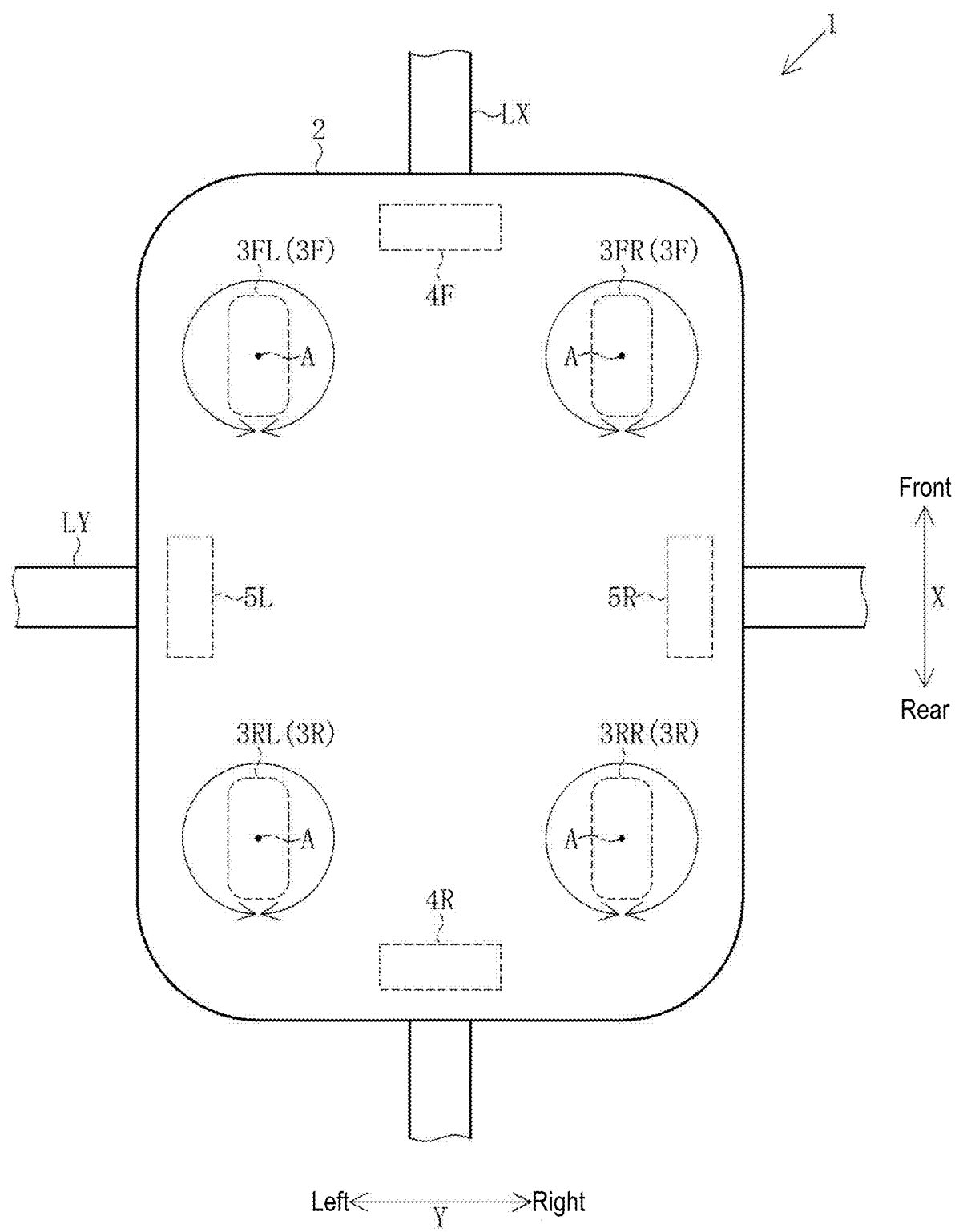
FIG. 1 is a schematic diagram of an unmanned carrier vehicle according to an embodiment of the disclosure.

The disclosure provides an unmanned carrier vehicle capable of switching between a normal driving mode, which allows for straight-line travel in a front-rear direction, and a lateral driving mode, which allows for straight-line travel in a left-right direction. The unmanned carrier vehicle includes a plurality of wheels spaced apart in the front-rear direction and the left-right direction; a braking device for restricting rolling of at least two of the wheels; a steering device for changing the direction of the plurality of wheels; and a control device for controlling the braking device and the steering device. The control device, with one set of the wheels as a primary steered wheel and the other one set of the wheels as a secondary steered wheel among the plurality of wheels, controls the steering device to change the direction of the secondary steered wheel after changing the direction of the primary steered wheel when switching between the normal driving mode and the lateral driving mode; and further controls the braking device to restrict the rolling of at least one of the wheels included in the secondary steered wheel when changing the direction of the primary steered wheel, and to restrict the rolling of at least one of the wheels included in the primary steered wheel when changing the direction of the secondary steered wheel.

Moreover, it is preferable that front wheels and rear wheels spaced apart in the front-rear direction are included as the wheels. The front wheels include a left front wheel and a right front wheel spaced apart in the left-right direction, and the rear wheels include a left rear wheel and a right rear wheel spaced apart in the left-right direction. Among one set of the left front wheel and the right rear wheel and one set of the right front wheel and the left rear wheel, one is the primary steered wheel and the other is the secondary steered wheel.

Moreover, it is preferable that the rolling of any one set among one set of the left front wheel and the left rear wheel, one set of the right front wheel and the right rear wheel, one set of the left front wheel and the right front wheel, and one set of the left rear wheel and the right rear wheel is restricted by the braking device.

Moreover, it is preferable that front wheels and rear wheels spaced apart in the front-rear direction are included as the wheels. The front wheels include a left front wheel and a right front wheel spaced apart in the left-right direction, and the rear wheels include a left rear wheel and a right rear wheel spaced apart in the left-right direction. One set of the left front wheel and the left rear wheel, one set of the right front wheel and the right rear wheel, one set of the left front wheel and the right front wheel, or one set of the left rear wheel and the right rear wheel is the primary steered wheel.

Moreover, it is preferable that the rolling of one among one set of the left front wheel and the right rear wheel and one set of the right front wheel and the left rear wheel is restricted by the braking device.

According to the disclosure, it is possible to provide an unmanned carrier vehicle capable of suppressing the posture change of the vehicle body when switching between a normal driving mode and a lateral driving mode.

An embodiment of the disclosure will be described with reference to FIG. 1 to FIG. 4D.

As shown in FIG. 1, an unmanned carrier vehicle 1 according to the embodiment includes a vehicle body 2, front wheels 3F and rear wheels 3R as the wheels, a guidance sensor 4F and a guidance sensor 4R for a normal driving mode, and a guidance sensor 5L and a guidance sensor 5R for a traverse driving mode. The unmanned carrier vehicle 1 travels by switching between a normal driving mode, which allows for straight-line travel in the front-rear direction X, and a lateral driving mode, which allows for straight-line travel in the left-right direction Y.

The vehicle body 2 is provided with a loading platform equipped with a transfer device (both not shown). The transfer device is constituted by, for example, a belt conveyor or a roller conveyor driven by a loading motor, and is controlled by a control device 8 (see FIG. 2) to be described later.

The front wheels 3F and the rear wheels 3R are spaced apart in the front-rear direction X. The front wheels 3F include a left front wheel 3FL and a right front wheel 3FR spaced apart in the left-right direction Y The rear wheels 3R include a left rear wheel 3RL and a right rear wheel 3RR spaced apart in the left-right direction Y In the embodiment, the left front wheel 3FL and the left rear wheel 3RL are driving wheels that roll when a driving force for the unmanned carrier vehicle 1 to travel is transmitted, and the right front wheel 3FR and the right rear wheel 3RR are driven wheels that roll as the left front wheel 3FL and the left rear wheel 3RL roll. When the left front wheel 3FL, the right front wheel 3FR, the left rear wheel 3RL, and the right rear wheel 3RR (hereinafter collectively referred to as "four wheels") face the front-rear direction X, the unmanned carrier vehicle 1 is in normal driving mode, and when the four wheels face the left-right direction Y, the unmanned carrier vehicle 1 is in traverse driving mode. Each of the four wheels is configured to be rotatable about an axis A perpendicular to the front-rear direction X and the left-right direction Y.

The guidance sensor 4F and the guidance sensor 4R are spaced apart in the front-rear direction X. When the unmanned carrier vehicle 1 is traveling in normal driving mode, the guidance sensor 4F and the guidance sensor 4R detect a guidance line LX provided on the road surface extending in the front-rear direction X, and output the detection result to the control device 8 (see FIG. 2), which will be described later.

The guidance sensor 5L and the guidance sensor 5R are spaced apart in the left-right direction Y When the unmanned carrier vehicle 1 travels in lateral driving mode, the guidance sensor 5L and the guidance sensor 5R detect a guidance line LY provided on the road surface extending in the left-right direction Y, and output the detection result to the control device 8 (see FIG. 2), which will be described later.

Figure 2:
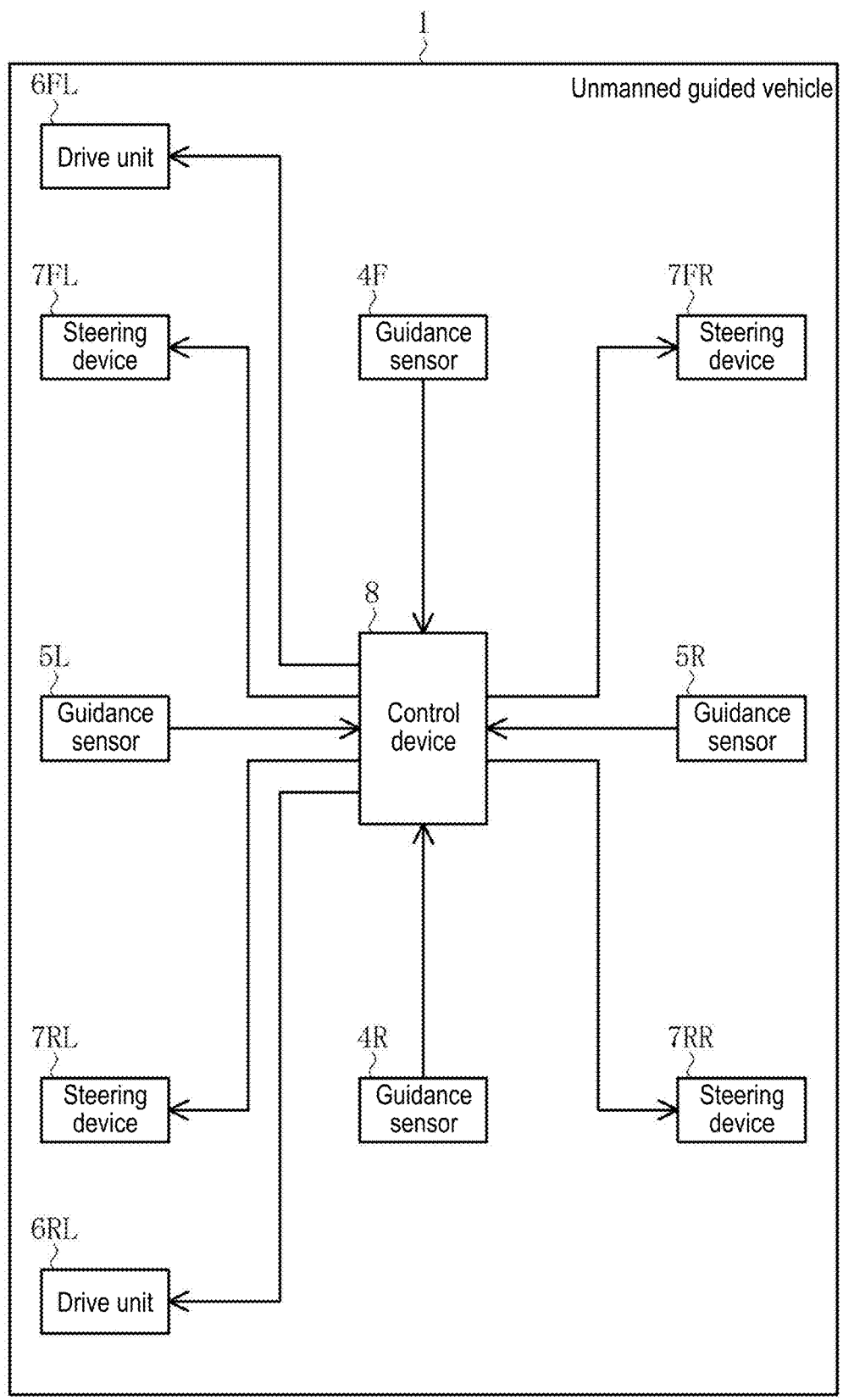
FIG. 2 is a block diagram showing a schematic configuration of an unmanned carrier vehicle according to the embodiment.

Moreover, as shown in FIG. 2, the unmanned carrier vehicle 1 includes a drive unit 6FL and a drive unit 6RL (hereinafter collectively referred to as "drive unit 6"), a steering device 7FL, a steering device 7FR, a steering device 7RL, a steering device 7RR (hereinafter collectively referred to as "steering device 7"), and the control device 8.

The drive unit 6 includes a traveling motor equipped with a brake. The drive unit 6 functions as a driving device that drives the driving wheels by operating the traveling motor, and also functions as a braking device that restricts the rolling of the driving wheels by operating the brake of the traveling motor. The drive unit 6FL is a driving device and a braking device for the left front wheel 3FL, and the drive unit 6RL is a driving device and a braking device for the left rear wheel 3RL.

The steering device 7 includes a steering motor equipped with a potentiometer. The steering device 7 changes the direction (steering angle) of the wheels by rotating the wheels about the axis A (see FIG. 1). The steering device 7FL changes the direction of the left front wheel 3FL, the steering device 7FR changes the direction of the right front wheel 3FR, the steering device 7RL changes the direction of the left rear wheel 3RL, and the steering device 7RR changes the direction of the right rear wheel 3RR.

The control device 8 includes a programmable logic controller and a motor driver. The control device 8 controls the drive unit 6 and the steering device 7 such that the unmanned carrier vehicle 1 travels along the guidance line LX detected by the guidance sensor 4F and guidance sensor 4R when in normal driving mode; and controls the drive unit 6 and the steering device 7 such that the unmanned carrier vehicle 1 travels along the guidance line LY detected by the guidance sensor 5L and the guidance sensor 5R when in lateral driving mode.

Moreover, the control device 8 controls the drive unit 6 and the steering device 7 to perform driving mode switching processing when switching from the normal driving mode to the lateral driving mode and when switching from the lateral driving mode to the normal driving mode. In the driving mode switching processing, the control device 8, with one set of the wheels as a primary steered wheel and the other one set of the wheels as a secondary steered wheel among the four wheels as a plurality of wheels, controls the steering device 7 to change the direction of the secondary steered wheel after changing the direction of the primary steered wheel. In the embodiment, the control device 8, with the left front wheel 3FL and the right rear wheel 3RR as the primary steered wheel and the right front wheel 3FR and the left rear wheel 3RL as the secondary steered wheel, controls the steering device 7FR and the steering device 7RL after controlling the steering device 7FL and the steering device 7RR.

Further, the control device 8 controls the drive unit 6 to restrict the rolling of at least one wheel included in the secondary steered wheel when changing the direction of the primary steered wheel, and to restrict the rolling of at least one wheel included in the primary steered wheel when changing the direction of the secondary steered wheel. In the embodiment, the control device 8 controls the drive unit 6RL to restrict the rolling of the left rear wheel 3RL when changing the direction of the left front wheel 3FL and the right rear wheel 3RR, and controls the drive unit 6FL to restrict the rolling of the left front wheel 3FL when changing the direction of the right front wheel 3FR and the left rear wheel 3RL.

Figure 3:
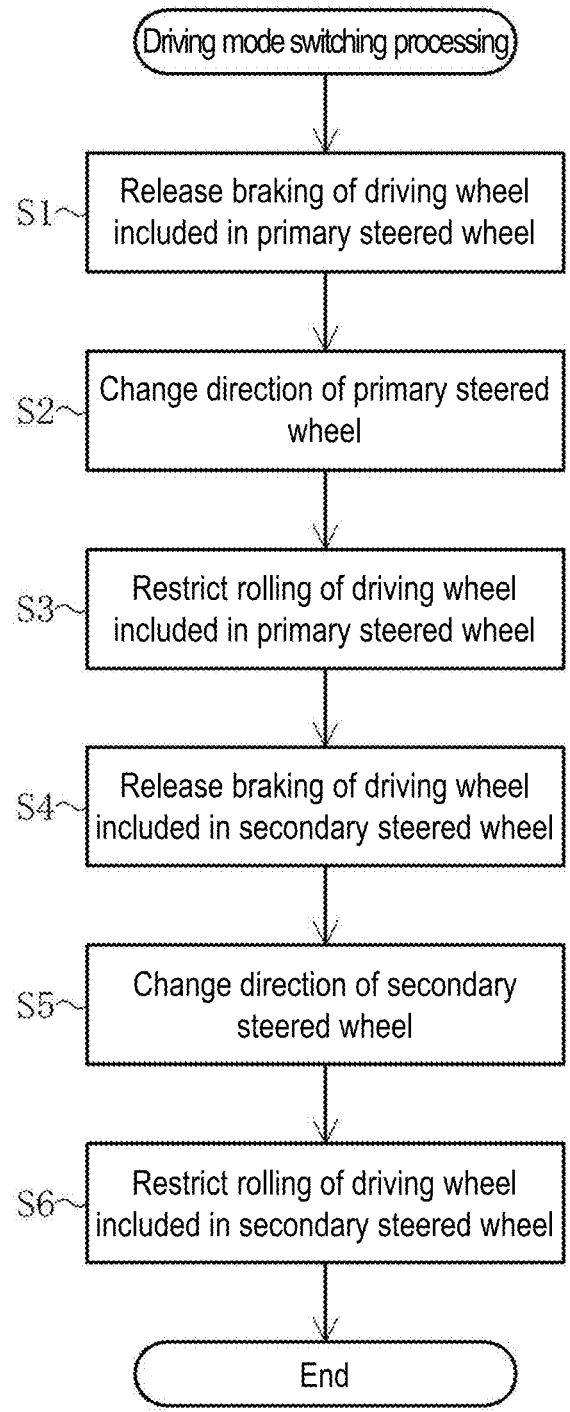
FIG. 3 is a flowchart showing a flow of driving mode switching processing according to the embodiment.

The flow of driving mode switching processing for switching between the normal driving mode and the lateral driving mode will be described in detail with reference to FIG. 3. The driving mode switching processing is started when the unmanned carrier vehicle 1 is stopped from traveling.

First, the control device 8 releases the braking of the driving wheel included in the primary steered wheel (step S1). In the embodiment, the control device 8 releases the brake of the drive unit 6FL, thereby releasing the braking of the left front wheel 3FL.

Next, the control device 8 changes the direction of the primary steered wheel such that the steering angle of the primary steered wheel changes by 90 degrees (step S2). In the embodiment, the control device 8 changes the direction of the left front wheel 3FL and the right rear wheel 3RR by operating the steering device 7FL and the steering device 7RR such that the steering angles of the left front wheel 3FL and the right rear wheel 3RR change by 90 degrees.

Next, the control device 8 restricts the rolling of the driving wheel included in the primary steered wheel (step S3), and releases the braking of the driving wheel included in the secondary steered wheel (step S4). In the embodiment, the control device 8 operates the brake of the drive unit 6FL to restrict the rolling of the left front wheel 3FL, and releases the brake of the drive unit 6RL to release the braking of the left rear wheel 3RL.

Next, the control device 8 changes the direction of the secondary steered wheel such that the steering angle of the secondary steered wheel changes by 90 degrees (step S5). In the embodiment, the control device 8 changes the direction of the right front wheel 3FR and the left rear wheel 3RL by operating the steering device 7FR and the steering device 7RL such that the steering angles of the right front wheel 3FR and the left rear wheel 3RL change by 90 degrees.

Then, the control device 8 restricts the rolling of the driving wheel included in the secondary steered wheel (step S6). In the embodiment, the control device 8 operates the brake of the drive unit 6RL to restrict the rolling of the left rear wheel 3RL.

With reference to FIG. 4A to FIG. 4D, a description will be given of the change in the direction of the front wheels 3F and the rear wheels 3R when switching from the normal driving mode to the lateral driving mode. In FIG. 4A to FIG. 4D, the wheel whose rolling is restricted is shown with thicker lines than the wheel whose rolling is not restricted.

Figure 4A:
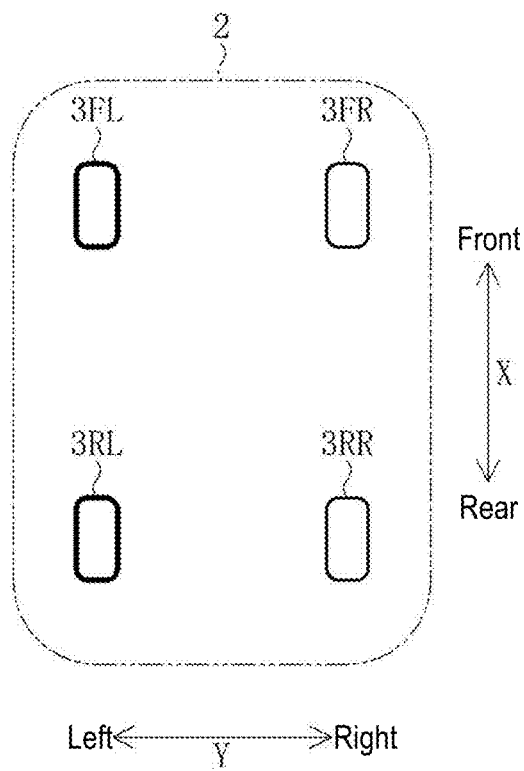
FIG. 4A to FIG. 4D are schematic diagrams for illustrating the operation of an unmanned carrier vehicle according to the embodiment.

As shown in FIG. 4A, before switching from the normal driving mode to the lateral driving mode, the drive unit 6FL and the drive unit 6RL operate the brakes to restrict the rolling of the left front wheel 3FL and the left rear wheel 3RL such that the unmanned carrier vehicle 1 stops traveling. If the unmanned carrier vehicle 1 has stopped traveling, the driving mode switching processing may be started without restricting the rolling of the left front wheel 3FL and the left rear wheel 3RL.

Figure 4B:
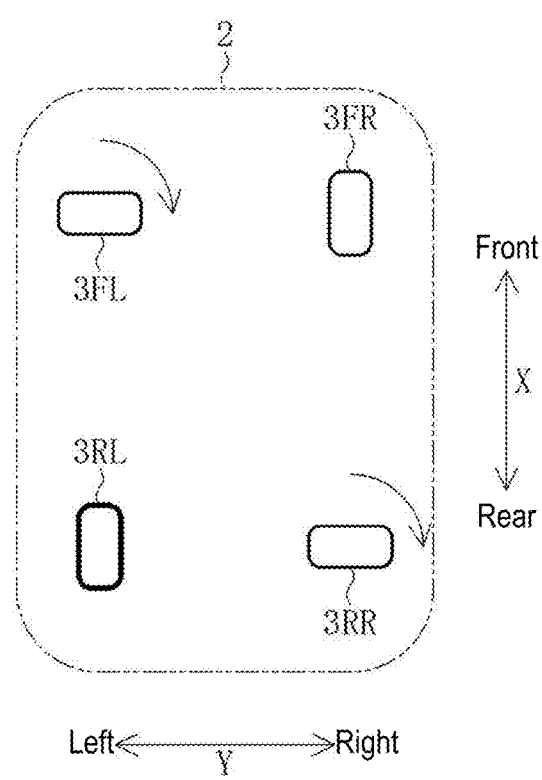

Next, as shown in FIG. 4B, the steering device 7FL and the steering device 7RR change the direction of the left front wheel 3FL and the right rear wheel 3RR, such that the left front wheel 3FL and the right rear wheel 3RR face the left-right direction Y. At this time, the drive unit 6FL releases the brake to remove the restriction on the rolling of the left front wheel 3FL, and the drive unit 6RL operates the brake such that the rolling of the left rear wheel 3RL is restricted. Thus, displacement of the vehicle body 2 in the front-rear direction X is suppressed by the left rear wheel 3RL, and displacement of the vehicle body 2 in the left-right direction Y is suppressed by the right front wheel 3FR and the left rear wheel 3RL.

Figure 4C:
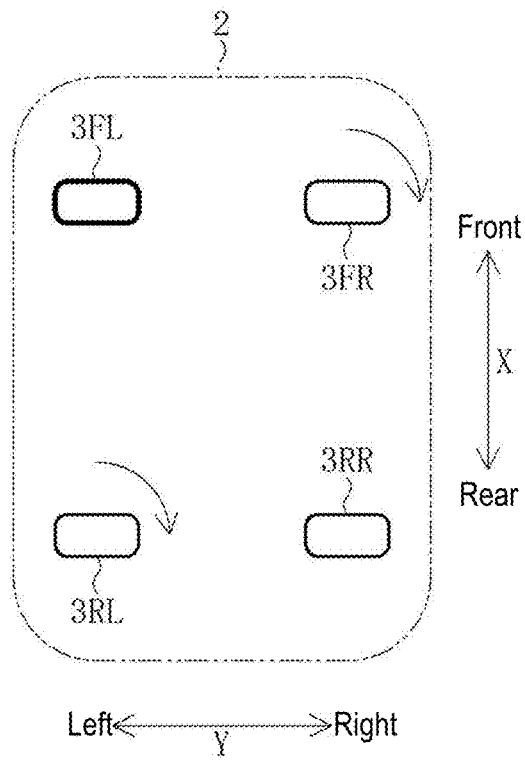

Next, as shown in FIG. 4C, the steering device 7FR and the steering device 7RL change the direction of the right front wheel 3FR and the left rear wheel 3RL, such that the right front wheel 3FR and the left rear wheel 3RL also face the left-right direction Y. At this time, the drive unit 6RL releases the brake to remove the restriction on the rolling of the left rear wheel 3RL, and the drive unit 6FL operates the brake such that the rolling of the left front wheel 3FL is restricted. Thus, displacement of the vehicle body 2 in the front-rear direction X is suppressed by the left front wheel 3FL and the right rear wheel 3RR, and displacement of the vehicle body 2 in the left-right direction Y is suppressed by the left front wheel 3FL.

Figure 4D:
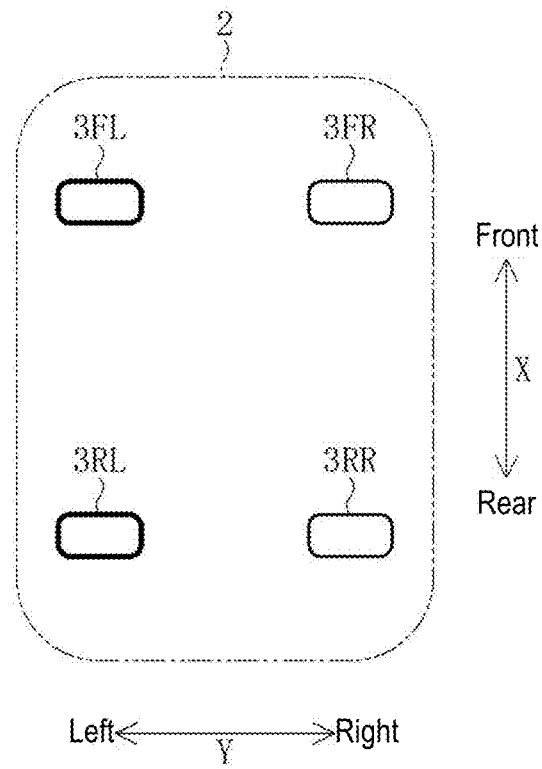

Then, as shown in FIG. 4D, after switching from the normal driving mode to the lateral driving mode, the drive unit 6FL and the drive unit 6RL operate the brakes such that the rolling of the left front wheel 3FL and the left rear wheel 3RL is restricted until the unmanned carrier vehicle 1 starts to travel. Moreover, after switching from the normal driving mode to the lateral driving mode, the unmanned carrier vehicle 1 may start to travel without restricting the rolling of the left front wheel 3FL and the left rear wheel 3RL.

The following effects can be obtained in the embodiment.

(1) The control device 8, with the left front wheel 3FL and the right rear wheel 3RR as the primary steered wheel and the right front wheel 3FR and the left rear wheel 3RL as the secondary steered wheel, controls the steering device 7 to change the direction of the secondary steered wheel after changing the direction of the primary steered wheel when switching between the normal driving mode and the lateral driving mode. Moreover, the control device 8 controls the drive unit 6 (braking device) to restrict the rolling of the left rear wheel 3RL included in the secondary steered wheel when changing the direction of the primary steered wheel, and to restrict the rolling of the left front wheel 3FL included in the primary steered wheel when changing the direction of the secondary steered wheel. According to such configuration, when the direction of the primary steered wheel changes, the secondary steered wheel including the left rear wheel 3RL, whose rolling is restricted, does not move, thereby suppressing the posture change of the vehicle body 2; and when the direction of the secondary steered wheel changes, the primary steered wheel including the left front wheel 3FL, whose rolling is restricted, does not move, thereby suppressing the posture change of the vehicle body 2. Thus, the posture change of the vehicle body 2 can be suppressed when switching between the normal driving mode and the lateral driving mode.

(2) One set of the left front wheel 3FL and the right rear wheel 3RR is the primary steered wheel, and one set of the right front wheel 3FR and the left rear wheel 3RL is the secondary steered wheel. Thus, by simultaneously changing the direction of a pair of the front wheels 3F and the rear wheels 3R that are positioned at a distance with each other, the posture change of the vehicle body 2 can be further suppressed.

The disclosure is not limited to the above-described embodiment, and the above-described configurations may be modified. For example, the following modifications may be made, or the following modifications may be combined.

The right front wheel 3FR and the left rear wheel 3RL may be the primary steered wheel, and the left front wheel 3FL and the right rear wheel 3RR may be the secondary steered wheel. In this case, the control device 8 controls the drive unit 6 to restrict the rolling of the left front wheel 3FL included in the secondary steered wheel when changing the direction of the primary steered wheel, and to restrict the rolling of the left rear wheel 3RL included in the primary steered wheel when changing the direction of the secondary steered wheel.

By changing the configuration of the drive unit 6, the right front wheel 3FR and the right rear wheel 3RR may be driving wheels, and the left front wheel 3FL and the left rear wheel 3RL may be driven wheels. In other words, the rolling of the right front wheel 3FR and the right rear wheel 3RR may be restricted by a braking device.

By changing the configuration of the drive unit 6, one of the front wheels 3F and the rear wheels 3R may be the driving wheels and the other may be the driven wheels. In other words, the rolling of the left front wheel 3FL and the right front wheel 3FR, or the rolling of the left rear wheel 3RL and the right rear wheel 3RR may be restricted by a braking device.

With reference to FIG. 5A to FIG. 5D, the change in the direction of the front wheels 3F and the rear wheels 3R when switching from the normal driving mode to the lateral driving mode in a configuration in which the rolling of the left front wheel 3FL and the right front wheel 3FR is restricted will be described.

Figure 5A:
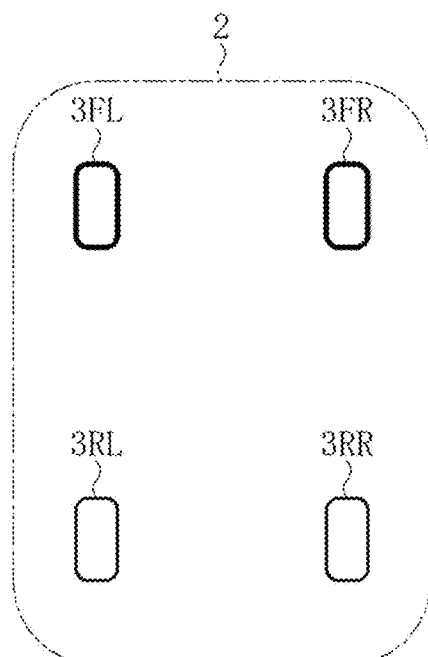
FIG. 5A to FIG. 5D are schematic diagrams for illustrating the operation of an unmanned carrier vehicle according to a modified example.

As shown in FIG. 5A, before switching from the normal driving mode to the lateral driving mode, the rolling of the left front wheel 3FL and the right front wheel 3FR is restricted such that the unmanned carrier vehicle 1 stops traveling.

Figure 5B:
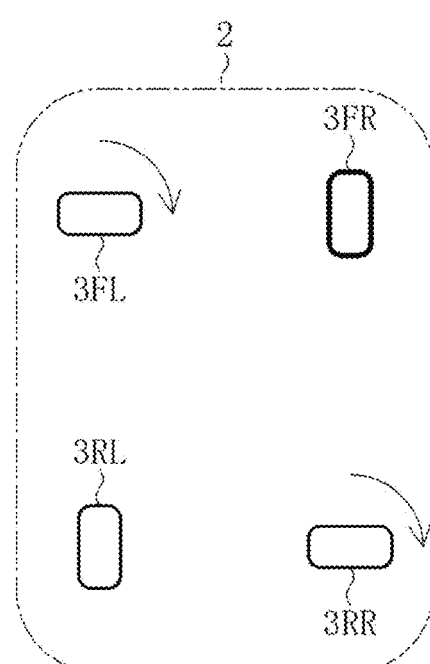

Next, as shown in FIG. 5B, the steering device 7FL and the steering device 7RR change the direction of the left front wheel 3FL and the right rear wheel 3RR, such that the left front wheel 3FL and the right rear wheel 3RR face the left-right direction Y. At this time, the restriction on the rolling of the left front wheel 3FL is removed, and the rolling of the right front wheel 3FR is restricted. Thus, displacement of the vehicle body 2 in the front-rear direction X is suppressed by the right front wheel 3FR, and displacement of the vehicle body 2 in the left-right direction Y is suppressed by the right front wheel 3FR and the left rear wheel 3RL.

Figure 5C:
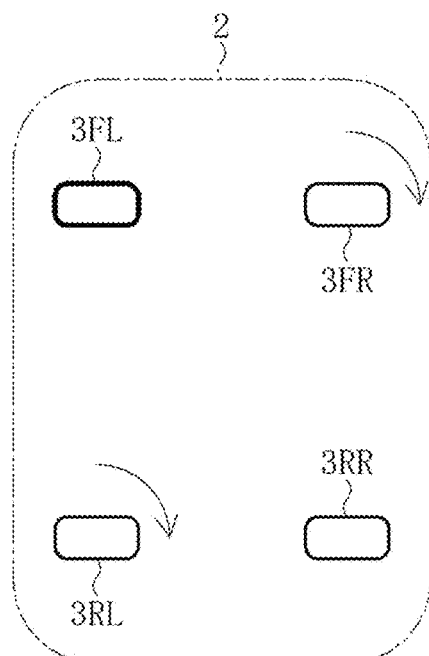

Next, as shown in FIG. 5C, the steering device 7FR and the steering device 7RL change the direction of the right front wheel 3FR and the left rear wheel 3RL, such that the right front wheel 3FR and the left rear wheel 3RL also face the left-right direction Y. At this time, the restriction on the rolling of the right front wheel 3FR is removed, and the rolling of the left front wheel 3FL is restricted. Thus, displacement of the vehicle body 2 in the front-rear direction X is suppressed by the left front wheel 3FL and the right rear wheel 3RR, and displacement of the vehicle body 2 in the left-right direction Y is suppressed by the left front wheel 3FL.

Figure 5D:
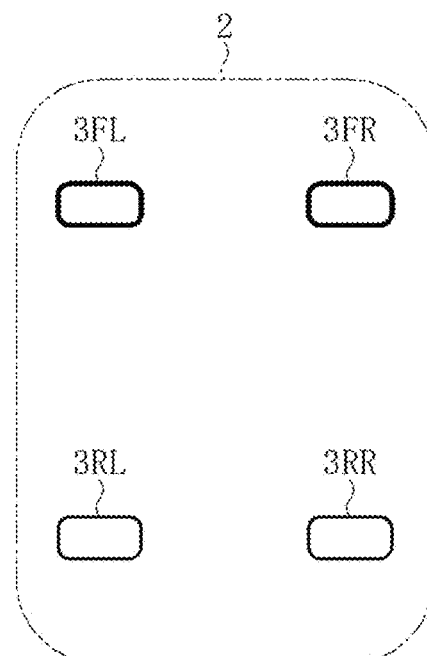

Then, as shown in FIG. 5D, after switching from the normal driving mode to the lateral driving mode, the rolling of the left front wheel 3FL and the right front wheel 3FR is restricted until the unmanned carrier vehicle 1 starts to travel.

By changing the configuration of the drive unit 6, one among the one set of the left front wheel 3FL and the right rear wheel 3RR and the one set of the right front wheel 3FR and the left rear wheel 3RL may be the driving wheels and the other may be the driven wheels. In other words, the rolling of the left front wheel 3FL and the right rear wheel 3RR, or the rolling of the right front wheel 3FR and the left rear wheel 3RL, may be restricted by a braking device.

With reference to FIG. 6A to FIG. 6D, the change in the direction of the front wheels 3F and the rear wheels 3R when switching from the normal driving mode to the lateral driving mode in a configuration with the left front wheel 3FL and the right rear wheel 3RR as the driving wheels and the left front wheel 3FL and the left rear wheel 3RL as the primary steered wheel will be described.

Figure 6A:
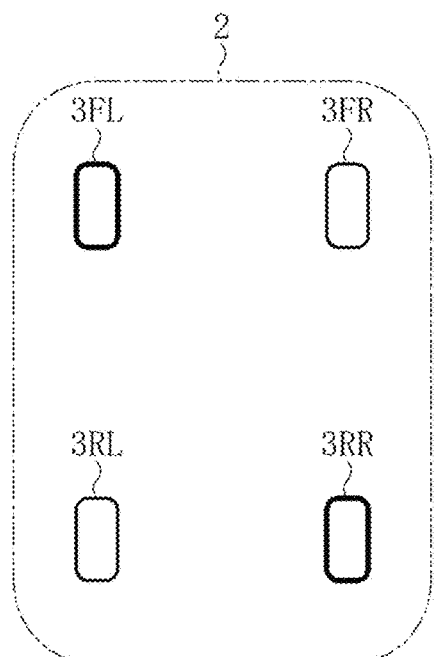
FIG. 6A to FIG. 6D are schematic diagrams for illustrating the operation of an unmanned carrier vehicle according to a modified example.

As shown in FIG. 6A, before switching from the normal driving mode to the lateral driving mode, the rolling of the left front wheel 3FL and the right rear wheel 3RR is restricted such that the unmanned carrier vehicle 1 stops traveling.

Figure 6B:
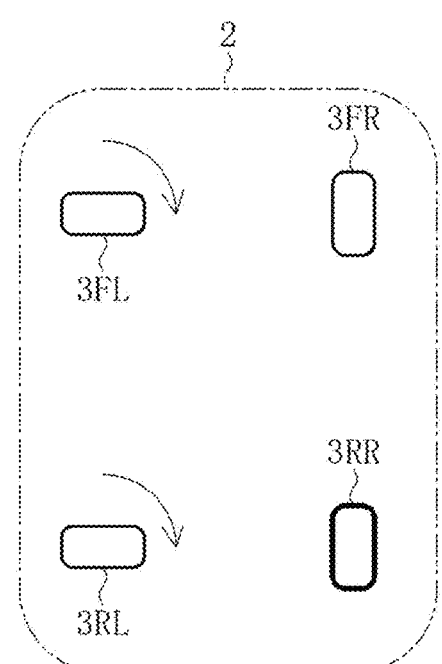

Next, as shown in FIG. 6B, the steering device 7FL and the steering device 7RL change the direction of the left front wheel 3FL and the left rear wheel 3RL, such that the left front wheel 3FL and the left rear wheel 3RL face the left-right direction Y. At this time, the restriction on the rolling of the left front wheel 3FL is removed, and the rolling of the right rear wheel 3RR is restricted. Thus, displacement of the vehicle body 2 in the front-rear direction X is suppressed by the right rear wheel 3RR, and displacement of the vehicle body 2 in the left-right direction Y is suppressed by the right front wheel 3FR and the right rear wheel 3RR.

Figure 6C:
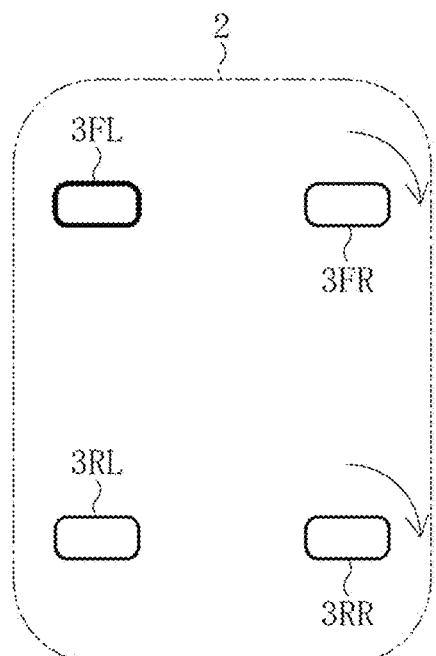

Next, as shown in FIG. 6C, the steering device 7FR and the steering device 7RR change the direction of the right front wheel 3FR and the right rear wheel 3RR, such that the right front wheel 3FR and the right rear wheel 3RR also face the left-right direction Y. At this time, the restriction on the rolling of the right rear wheel 3RR is removed, and the rolling of the left front wheel 3FL is restricted. Thus, displacement of the vehicle body 2 in the front-rear direction X is suppressed by the left front wheel 3FL and the left rear wheel 3RL, and displacement of the vehicle body 2 in the left-right direction Y is suppressed by the left front wheel 3FL.

Figure 6D:
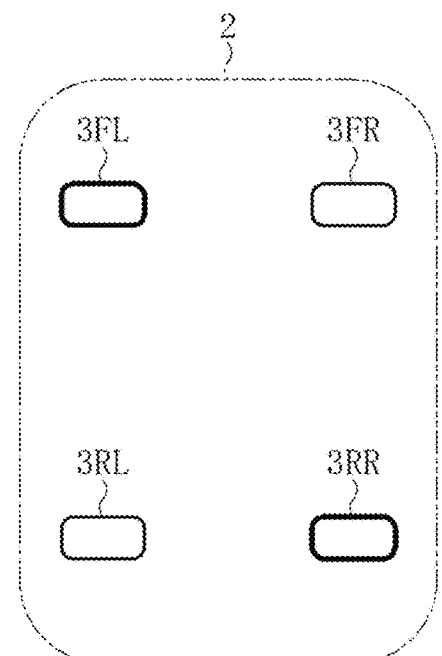

Then, as shown in FIG. 6D, after switching from the normal driving mode to the lateral driving mode, the rolling of the left front wheel 3FL and the right rear wheel 3RR is restricted until the unmanned carrier vehicle 1 starts to travel.

Further, with reference to FIG. 7A to FIG. 7D, the change in the direction of the front wheels 3F and the rear wheels 3R when switching from the normal driving mode to the lateral driving mode in a configuration with the left front wheel 3FL and the right rear wheel 3RR as the driving wheels and the front wheels 3F as the primary steered wheel will be described.

Figure 7A:
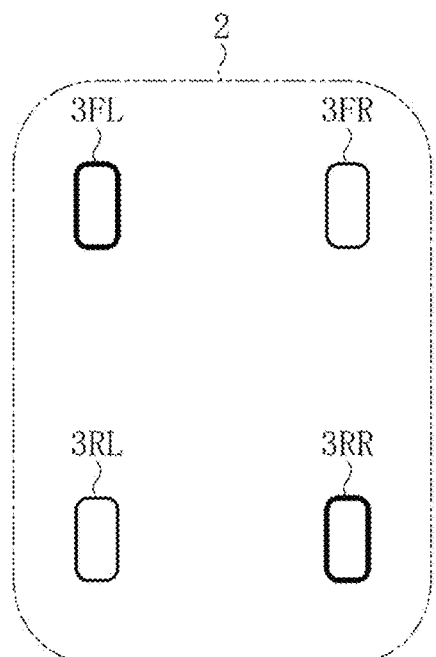
FIG. 7A to FIG. 7D are schematic diagrams for illustrating the operation of an unmanned carrier vehicle according to a modified example.

As shown in FIG. 7A, before switching from the normal driving mode to the lateral driving mode, the rolling of the left front wheel 3FL and the right rear wheel 3RR is restricted such that the unmanned carrier vehicle 1 stops traveling.

Figure 7B:
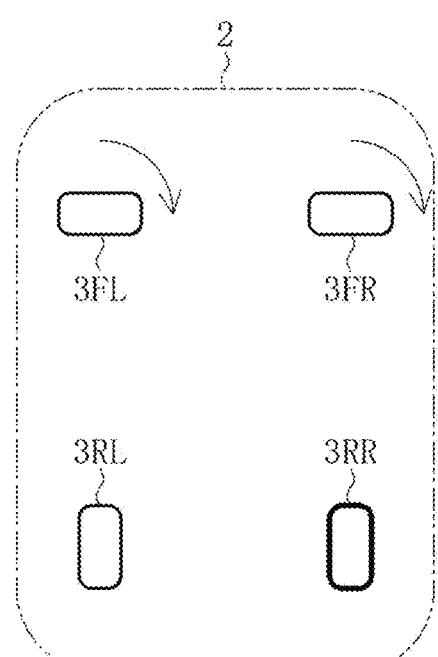

Next, as shown in FIG. 7B, the steering device 7FL and the steering device 7FR change the direction of the left front wheel 3FL and the right front wheel 3FR, such that the left front wheel 3FL and the right front wheel 3FR face the left-right direction Y. At this time, the restriction on the rolling of the left front wheel 3FL is removed, and the rolling of the right rear wheel 3RR is restricted. Thus, displacement of the vehicle body 2 in the front-rear direction X is suppressed by the right rear wheel 3RR, and displacement of the vehicle body 2 in the left-right direction Y is suppressed by the left rear wheel 3RL and the right rear wheel 3RR.

Figure 7C:
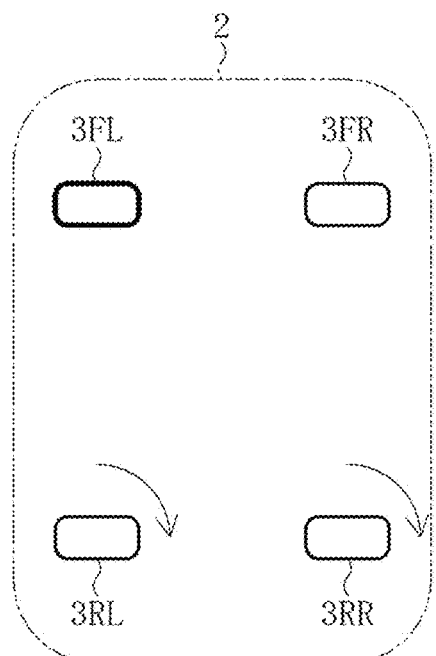

Next, as shown in FIG. 7C, the steering device 7RL and the steering device 7RR change the direction of the left rear wheel 3RL and the right rear wheel 3RR, such that the left rear wheel 3RL and the right rear wheel 3RR also face the left-right direction Y. At this time, the restriction on the rolling of the right rear wheel 3RR is removed, and the rolling of the left front wheel 3FL is restricted. Thus, displacement of the vehicle body 2 in the front-rear direction X is suppressed by the left front wheel 3FL and the right front wheel 3FR, and displacement of the vehicle body 2 in the left-right direction Y is suppressed by the left front wheel 3FL.

Figure 7D:
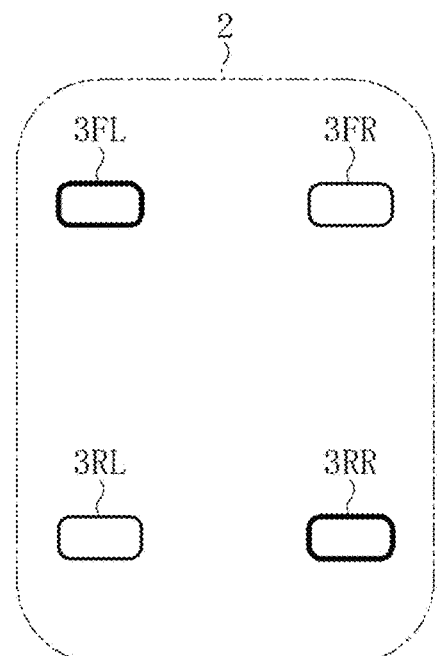
Figure 8A:
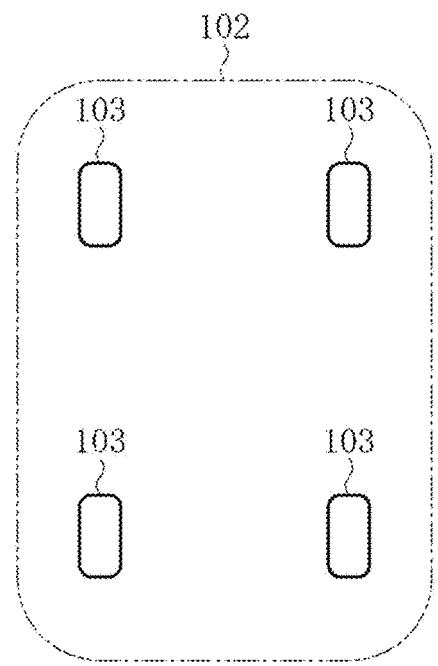
FIG. 8A to FIG. 8C are schematic diagrams for illustrating the operation of an unmanned carrier vehicle according to a conventional example.
Figure 8B:
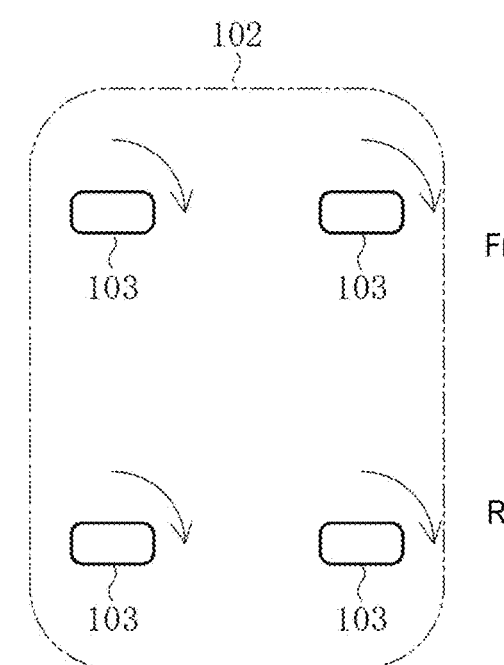
Figure 8C:
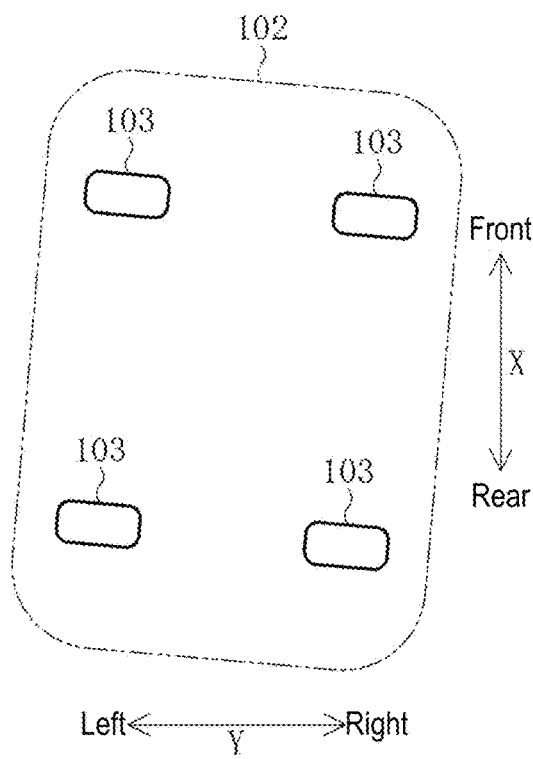

Then, as shown in FIG. 7D, after switching from the normal driving mode to the lateral driving mode, the rolling of the left front wheel 3FL and the right rear wheel 3RR is restricted until the unmanned carrier vehicle 1 starts to travel.

The unmanned carrier vehicle 1 may be equipped with five or more wheels. Moreover, the braking device may also restrict the rolling of three or more wheels, and the control device may control the steering device to restrict the rolling of two or more wheels included in the secondary steered wheel when changing the direction of the primary steered wheel, or to restrict the rolling of two or more wheels included in the primary steered wheel when changing the direction of the secondary steered wheel.

What is claimed is:

1. An unmanned carrier vehicle capable of switching between a normal driving mode, which allows for straight-line travel in a front-rear direction, and a lateral driving mode, which allows for straight-line travel in a left-right direction, the unmanned carrier vehicle comprising:
    a plurality of wheels spaced apart in the front-rear direction and the left-right direction;
    a braking device for restricting rolling of at least two of the wheels;
    a steering device for changing the direction of the plurality of wheels; and
    a control device for controlling the braking device and the steering device,
    wherein the control device:
        with one set of the wheels as a primary steered wheel and the other one set of the wheels as a secondary steered wheel among the plurality of wheels, controls the steering device to change the direction of the secondary steered wheel after changing the direction of the primary steered wheel when switching between the normal driving mode and the lateral driving mode; and
        further controls the braking device to restrict the rolling of at least one of the wheels included in the secondary steered wheel when changing the direction of the primary steered wheel, and to restrict the rolling of at least one of the wheels included in the primary steered wheel when changing the direction of the secondary steered wheel.

2. The unmanned carrier vehicle according to claim 1, comprising:
    front wheels and rear wheels spaced apart in the front-rear direction as the wheels,
    wherein the front wheels include a left front wheel and a right front wheel spaced apart in the left-right direction, and the rear wheels include a left rear wheel and a right rear wheel spaced apart in the left-right direction, and
    among one set of the left front wheel and the right rear wheel and one set of the right front wheel and the left rear wheel, one is the primary steered wheel and the other is the secondary steered wheel.

3. The unmanned carrier vehicle according to claim 2, wherein the rolling of any one set among one set of the left front wheel and the left rear wheel, one set of the right front wheel and the right rear wheel, one set of the left front wheel and the right front wheel, and one set of the left rear wheel and the right rear wheel is restricted by the braking device.

4. The unmanned carrier vehicle according to claim 1, comprising:
    front wheels and rear wheels spaced apart in the front-rear direction as the wheels,
    wherein the front wheels include a left front wheel and a right front wheel spaced apart in the left-right direction, and the rear wheels include a left rear wheel and a right rear wheel spaced apart in the left-right direction, and
    one set of the left front wheel and the left rear wheel, one set of the right front wheel and the right rear wheel, one set of the left front wheel and the right front wheel, or one set of the left rear wheel and the right rear wheel is the primary steered wheel.

5. The unmanned carrier vehicle according to claim 4, wherein the rolling of one among one set of the left front wheel and the right rear wheel and one set of the right front wheel and the left rear wheel is restricted by the braking device.

* * * * *